US012584340B2

(12) United States Patent (10) Patent No.: US 12,584,340 B2

Krijgsman et al. (45) Date of Patent: Mar. 24, 2026

(54) PANEL DEVICE

(71) Applicant: POLYPLASTIC B.V., Rotterdam (NL)

(72) Inventors: Pieter Sietze Krijgsman, Rotterdam (NL); Bianca Catharina Van Bemmel-Welle, Rotterdam (NL)

(73) Assignee: POLYPLASTIC B.V., Rotterdam (NL)

( * ) Notice: Subject to any disclaimer, the term of this patent is extended or adjusted under 35 U.S.C. 154(b) by 354 days.

(21) Appl. No.: 18/134,375

(22) Filed: Apr. 13, 2023

(65) Prior Publication Data

US 2023/0332452 A1 Oct. 19, 2023

(30) Foreign Application Priority Data

Apr. 14, 2022 (NL) ...................................... 2031588

(51) Int. Cl.
E05F 11/04 (2006.01)
B60J 7/16 (2006.01)
(Continued)

(52) U.S. Cl.
CPC ............. E05F 11/04 (2013.01); B60J 7/1657 (2013.01); E05D 15/42 (2013.01); E05F 15/627 (2015.01); B60J 7/1642 (2013.01); E05Y 2201/434 (2013.01); E05Y 2201/626 (2013.01); E05Y 2201/654 (2013.01); E05Y 2201/664 (2013.01); E05Y 2201/684 (2013.01);
(Continued)

(58) Field of Classification Search
CPC ........ E05F 11/04; E05F 15/627; E05D 15/42; E05D 15/463; E05D 15/466; B60J 7/1657

USPC ........................................................ 296/160
See application file for complete search history.

(56) References Cited

U.S. PATENT DOCUMENTS 3,976,325 A * 8/1976 Schatzler ................. B60J 7/057
49/353
4,903,435 A * 2/1990 Bittmann .............. E05F 15/627
49/340

(Continued)

FOREIGN PATENT DOCUMENTS

DE 102019200066 A1 7/2020
GB 2059498 A 4/1981

*Primary Examiner* — Jason S Morrow
(74) *Attorney, Agent, or Firm* — Perry + Currier

(57) ABSTRACT

A panel device, particularly a roof light for a recreational vehicle, comprises an at least substantially polygonal frame which surrounds an opening. A window is connected to the frame for pivoting about a pivot axis and comprises a panel which extends over the opening. Provided between the frame and the window is a stay device which is manipulable between a first position, in which the window is forced into a flat state and closes the opening, and at least one second position in which the window is raised by the stay device and leaves the opening at least partially clear. The stay device comprises a stay which extends movably from an elongate guide at a first outer end and is connected pivotally to the window at an opposite, second outer end. The stay is adjustable in the guide and is coupled to an actuator via a flexible transmission. The transmission comprises at least one tension-resistant pull member which is coupled to the stay and which is movable in an axially at least substantially rigid yet flexible sleeve, a first outer end of which is fixed to or close to the stay and a second outer end of which is attached to or close to the actuator.

14 Claims, 6 Drawing Sheets

(51) Int. Cl.
    *E05D 15/42*         (2006.01)
    *E05F 15/627*       (2015.01)
(52) U.S. Cl.
    CPC ... *E05Y 2201/702* (2013.01); *E05Y 2201/704*
        (2013.01); *E05Y 2900/512* (2013.01); *E05Y*
        *2900/542* (2013.01)

(56)           References Cited

U.S. PATENT DOCUMENTS

| | | | | |
|---|---|---|---|---|
| 5,829,199 | A * | 11/1998 | Harvey | E05F 15/619 |
| | | | | 49/325 |
| 6,669,278 | B2 * | 12/2003 | Patelczyk | B60J 7/047 |
| | | | | 296/222 |
| 2005/0102905 | A1 | 5/2005 | Ichinose | |
| 2005/0160673 | A1 | 7/2005 | Kleinmann et al. | |
| 2014/0026709 | A1 * | 1/2014 | Derham | E05F 5/04 |
| | | | | 74/528 |

* cited by examiner

PANEL DEVICE

The present invention relates to a panel device, particularly a roof light, for a recreational vehicle, comprising an at least substantially polygonal frame which surrounds an opening and comprising a window, which window is connected to the frame for pivoting about a pivot axis and comprises a panel which extends over the opening, wherein provided between the frame and the window is at least a stay device which is manipulable between a first position, in which the window is forced into a flat state and closes the opening, and at least one second position in which the window is raised by the stay device and leaves the opening at least partially clear, which stay device comprises a stay which extends movably from an elongate guide at a first outer end and is connected pivotally to the window at an opposite, second outer end, wherein the stay is adjustable in the guide between a first position, in which the stay lies at least substantially flat relative to the guide, and a second position in which the stay has taken on a raised state from the guide. The invention relates here particularly to a panel device, such as a skylight, in a caravan or camper van.

Such a skylight is for instance known from German patent application 10 2019 200 066. The panel device described therein comprises a set of stays on either side of the frame. Lying over the frame is a transparent roof light which on a longitudinal side is connected pivotally to the frame and transversely thereof is coupled to the stays whereby the window can be opened. For this purpose one of the two stays comprises at its first outer end a handle whereby the stay can be manipulated between the first and second position. The relevant stay is connected by means of a flexible cable to the other stay so that the other stay will co-displace synchronously.

A drawback of this known configuration is an ingenious system of pulleys which is needed to guide the cable from the one to the other stay. This system not only makes the whole more susceptible to malfunction, but also requires additional components and the assembly time associated therewith. This is one of the reasons that the known panel device is expensive. The direct operation of the relevant stay is also relatively heavy in that the other stay is also co-displaced therewith. In order to avoid breaking, the handle must take a relatively heavy and large form, which mars the appearance of the window.

The present invention has for its object, among others, to provide a panel device, such as a skylight for a recreational vehicle, which obviates one or more of these drawbacks to at least significant extent.

In order to achieve the stated object a panel device of the type described in the preamble has the feature according to the invention that the stay is coupled to an actuator via a flexible transmission, that the transmission comprises at least one tension-resistant pull member which is coupled to the stay and moves the stay from one of the first and second position to another of the first and second position when the actuator is energized, and that the at least one pull member is introduced axially movably into an axially at least substantially rigid yet flexible sleeve, a first outer end of which is fixed to or close to the stay and a second outer end of which is attached to or close to the actuator. The axially rigid yet flexible sleeve thus provides for a guiding of the pull member. This sleeve with pull member can be accommodated in a wall of the frame in relatively simple manner without this involving a significant amount of assembly time. The actuator coupled to the pull member simplifies and facilitates operation of the panel, if desired. The actuator can here be provided at a practical location in or at the window.

A particular embodiment of the panel device has the feature here according to the invention that the guide extends between the first position and the second position on a first side of the frame, transversely of the pivot axis, that the actuator is provided on a further side of the frame lying opposite the pivot axis, and that the at least one sleeve and pull member extend over at least a part of the first side and at least a part of the further side of the frame.

In a particular embodiment the panel device has the feature according to the invention that the at least one pull member, particularly a first pull member, engages on the stay in a direction directed toward the first position, and that the at least one pull member, particularly a second pull member, engages on the stay in a direction directed towards the second position. The at least one pull member is here always coupled to the stay for tension, so that the first outer end thereof will always be pulled from the one to the other position. The transmission thus need not exert any pressure on the stay, and is conversely only placed under strain of tension.

A preferred embodiment of the panel device has the feature according to the invention that the stay device comprises on an opposite side of the frame a second stay, that the at least one pull member, particularly the first pull member, engages on the second stay in a direction directed toward the second position, and that the at least one pull member, particularly the second pull member, engages on the second stay in a direction directed toward the first position. The panel is thus coupled to a stay on both sides, and the transmission provides for a mutual synchronization of the displacements performed by the two stays in their guide. A tension on the one stay is here also transmitted to the other stay, so that both will move synchronously in the same direction and over the same distance. A practical embodiment of the panel device has the feature here according to the invention that the transmission comprises at least a pull member from a group of a substantially non-stretch cable, cord, chain and belt.

With a view to simple assembly, the frame is preferably already prepared in respect of its construction for the transmission to be placed therein. In this respect a particular embodiment of the panel device has the feature according to the invention that the frame comprises a tunnel in which the transmission is at least partially received. The tunnel thus provided beforehand in the frame determines the location of the sleeve with therein the at least one pull member of the transmission, which can simply be introduced therein during assembly of the whole.

Although the actuator can be embodied to be both manual and motorized in various ways, a preferred embodiment of the panel device has the feature according to the invention that the actuator comprises a reel which is mounted for rotation about a rotation shaft, that the at least one pull member winds onto the reel on a first side of the reel and unwinds from the reel on an opposite side when the reel rotates, particularly in at least one helical track which extends in an outer wall of the reel, and that the reel is provided with a drive whereby the reel can be set into a rotation about the rotation shaft. If desired, such a reel can be provided concealed from view in the wall of the frame, wherein the pull member winds thereon and simultaneously unwinds therefrom on the other side in the event of a rotation thereof. This provides a particularly compact yet no less effective control of the at least one stay.

If desired, a transmission ratio which facilitates operation of the reel can be provided. A further preferred embodiment of the panel device has the feature here that the drive is coupled to the rotation shaft via a worm wheel, wherein the worm wheel engages in a toothing of a toothed wheel which is coupled operatively to the rotation shaft. This transmission from a worm wheel to a toothed wheel is naturally unidirectional in the sense that the worm wheel drives the toothed wheel, but the worm wheel cannot conversely be set into rotation by the toothed wheel. The stay device of the panel device is thus self-inhibiting in the sense that, when a load is exerted thereon, the panel can set the drive into motion in opposite direction, whereby the panel could close inadvertently.

The above described actuator can if desired be energized and motorized in relatively simple manner. In this respect a particular embodiment of the panel device has the feature according to the invention that the frame comprises an electrically energizable electric motor. Such a drive motor can be accommodated invisibly in the wall of the frame, optionally together with the reel, and be provided with an electric power supply.

With a view to manual operation of the stay device a further particular embodiment of the panel device has the feature according to the invention that the drive comprises a crank with a crank handle shaft which is coupled operatively to the rotation shaft of the reel, which crank can be manually operated in order to perform a rotation about the crank handle shaft. Such a manual embodiment of the panel device can be produced relatively affordably. A further particular embodiment of the panel device has here the feature according to the invention that the handle is mounted for pivoting about the crank handle shaft and that the frame comprises a cavity into which the handle is at least partially pivotable. The frame thus provides close to the crank handle shaft manually releasable fixing means which secure a position of the handle in that it can be swung into the cavity provided in the frame and will thus resist a further rotation when it hits a wall of the cavity.

With a view to securing the panel device against break-ins a locking mechanism which keeps the panel in the locked state is preferably provided. In this respect a further preferred embodiment of the panel device has the feature according to the invention that the stay is adjustable in the guide between the first position and a third position, which lies beyond the first position as seen from the second position, that a locking device comprising a locking body on the frame and a locking cavity in the window is provided between the frame and the window, which locking body is tiltable about a lock axis and is receivable in the locking cavity, and that between the first position and the third position the stay touches the locking body and forces it round the lock axis in order to catch the locking body in the locking cavity.

In respect of a healthy living climate in for instance a recreational vehicle standards are set for a natural ventilation of the space therein. With a view thereto a further preferred embodiment of the panel device has the feature according to the invention that the frame comprises at least one ventilation channel which extends between a first ventilation opening on an outer side of the frame and a ventilation opening on an inner side of the frame, and that the ventilation channel crosses the transmission. With a view to a uniform distribution of this ventilation the panel device is here further preferably characterized in that the ventilation channel comprises between the first ventilation opening and the second ventilation opening a gap which extends substantially over a whole side of the frame.

The invention will be further elucidated hereinbelow with reference to an exemplary embodiment and an accompanying drawing. In the drawing.

Figure 1:
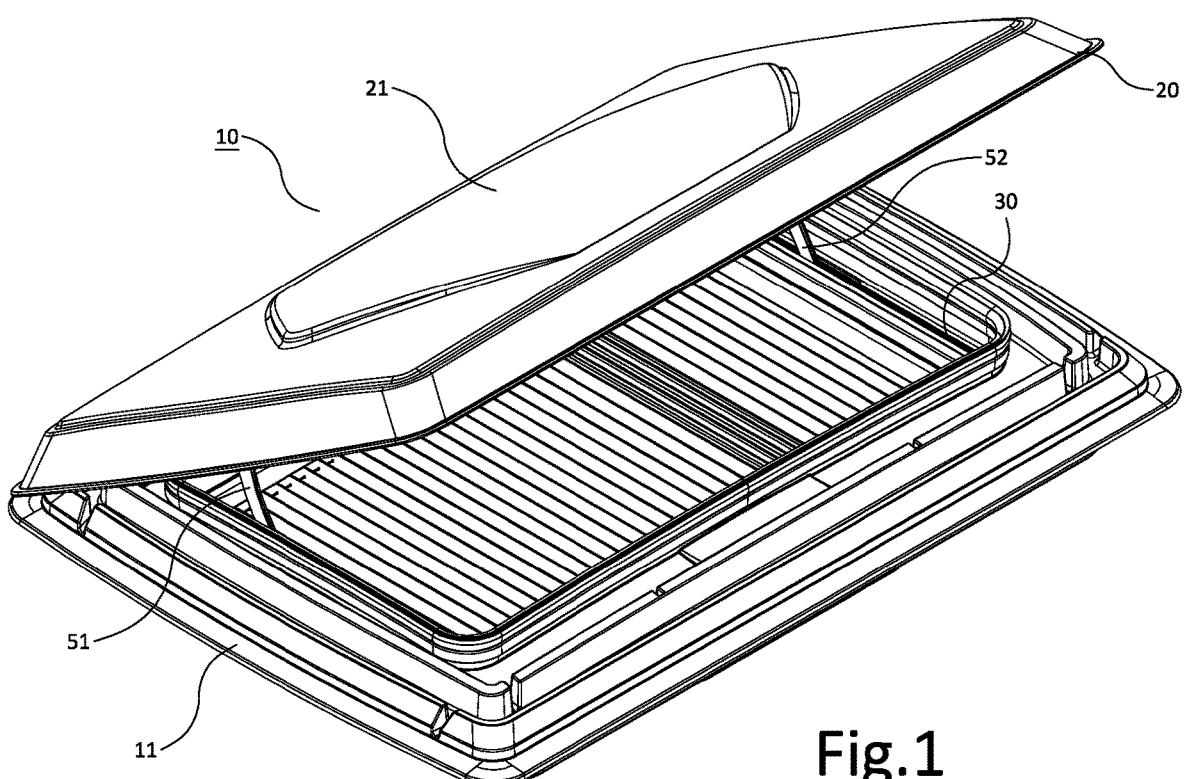
FIG. 1 is an isometric view of an exemplary embodiment of a panel device according to the invention.
Figure 8A:
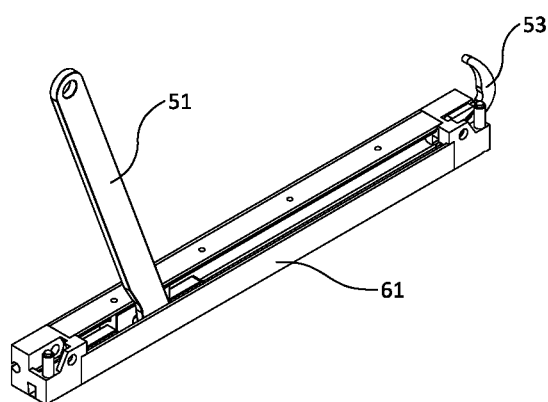
Figure 8B:
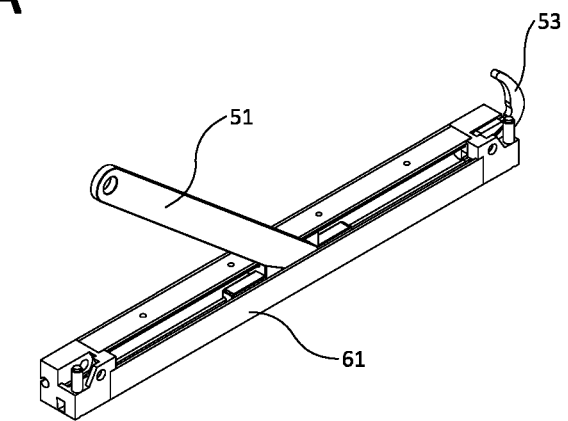
Figure 8C:
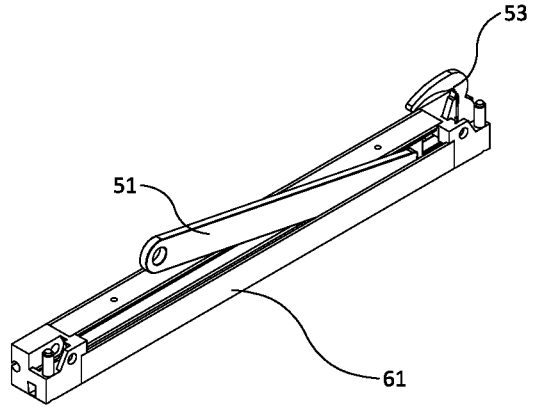

FIGS. 8A-C are isometric views of a stay and guide as applied in the panel device of FIG. 1 in successive closing stages.

It is otherwise noted here that the figures are purely schematic and not always drawn to (the same) scale. Some dimensions in particular may be exaggerated to greater or lesser extent for the sake of clarity. Corresponding parts are designated in the figures with the same reference numeral.

Figure 2:
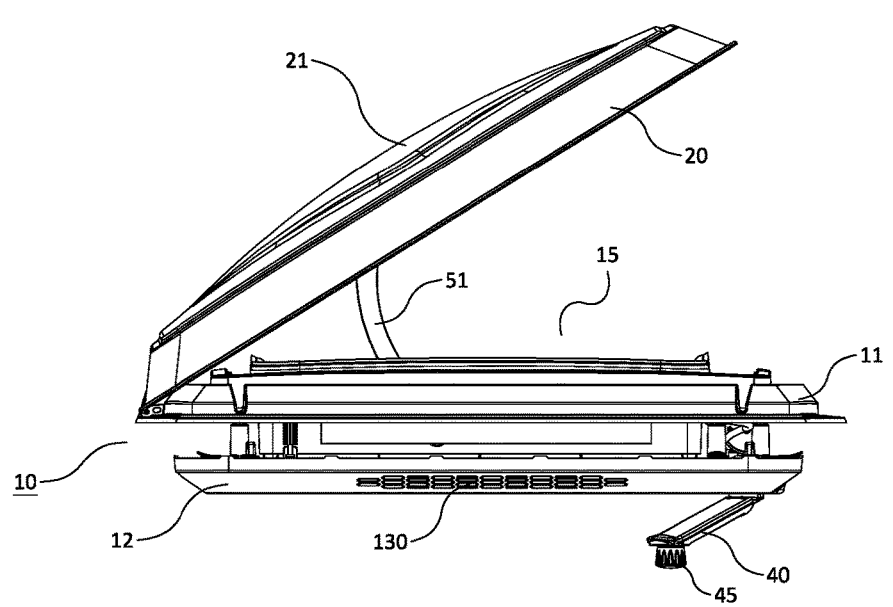
FIG. 2 is a side view of the panel device of FIG. 1.

FIG. 1 shows an isometric view of an exemplary embodiment of a panel device according to the invention in a ready-to-use state. The panel device comprises a frame with an upper side 11 and a lower side 12, see also FIG. 2, between which an edge part (not shown) of a roof of for instance a recreational vehicle is receivable. The two parts 11, 12 connect seamlessly to the edge part, wherein the external, exterior part 11 in particular also seals watertightly onto the edge part. The frame per se can be manufactured from various materials which are sufficiently strong and, in respect of the external part, are sufficiently weather-resistant. Aluminium or, as in this embodiment, an injection-moulded thermoplastic plastic is in this respect often opted for. In this case use is made of an outer shell of Acrylonitrile styrene acrylate (ASA) with a foamed core of polystyrene or polyurethane.

The edge part bounds an opening 15 which is opened up by the panel device. The panel device comprises for this purpose a window 20 which is formed substantially by a flat panel 21 which extends over the opening 15. In this embodiment the window is formed entirely from a transparent plastic such as poly(methyl methacrylate) (PMMA) or polycarbonate, and thereby allows daylight into the accommodation which will eventually be located under the panel device. A blind 30, which is in that case usually, as it is here, arranged adjustably in the internal, interior part 12 of the frame, can optionally be applied in the frame. The same is optionally the case for a screen which can be provided in the frame in similar manner to prevent insects from entering. Although use is in this embodiment made of a pleated blind 30, a roller blind and/or screen blind can also be applied instead.

Figure 3:
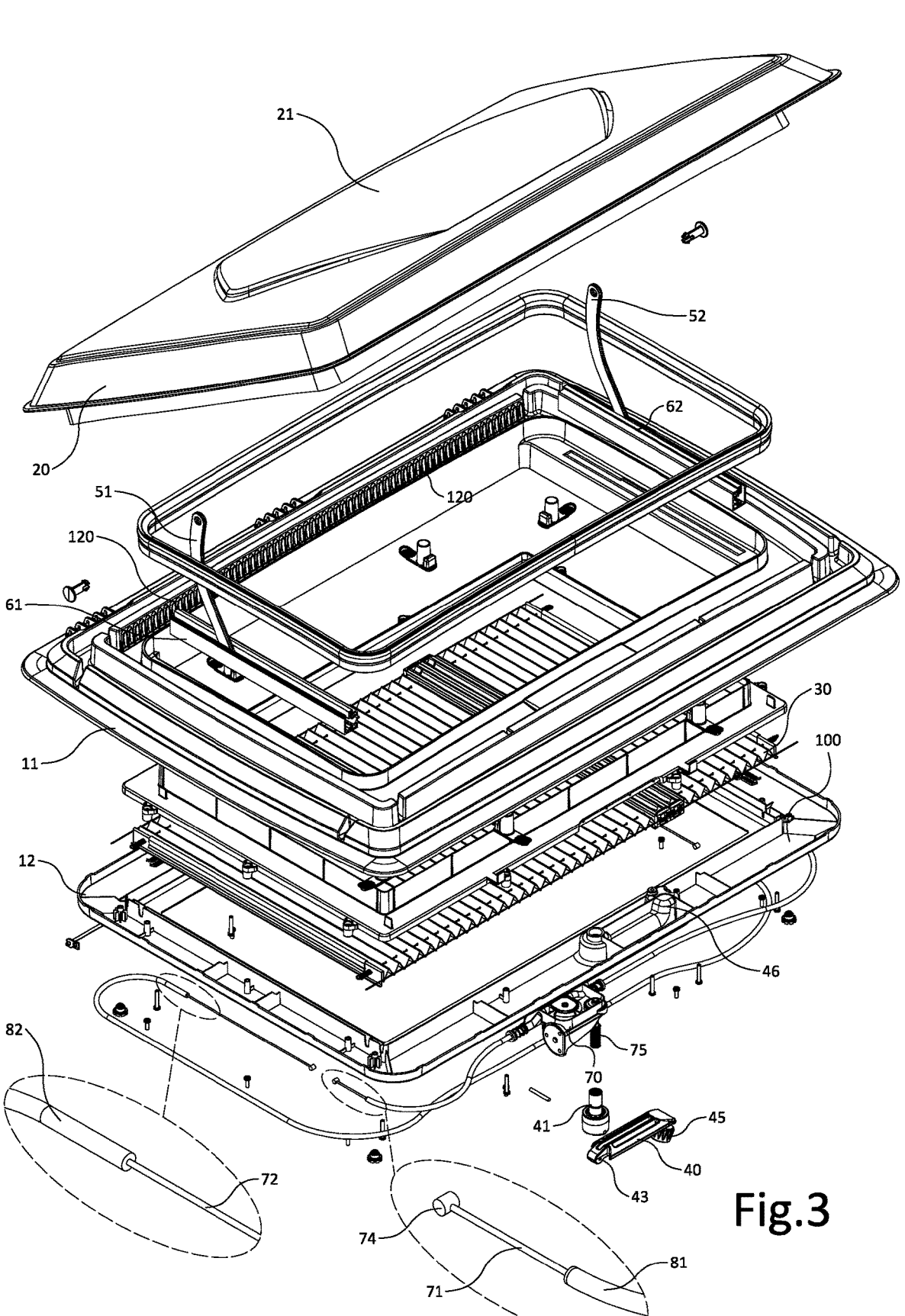
FIG. 3 is an exploded view of the panel device of FIG. 1.
Figure 4:
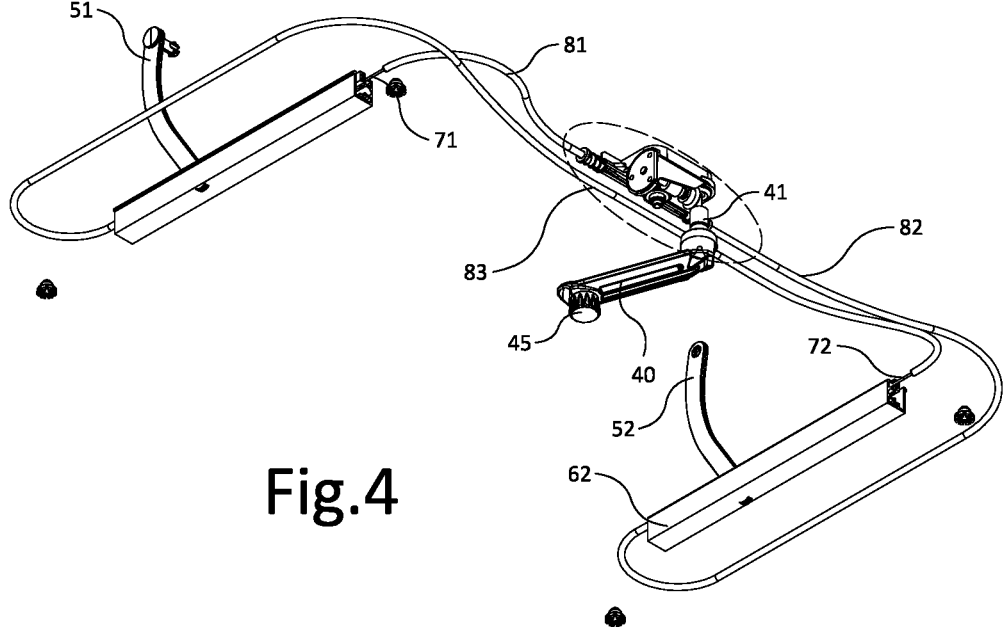
FIG. 4 is an isolated representation of the stay device applied in the panel device of FIG. 1.

On a longitudinal side thereof the window 20 is connected pivotally to the frame 11, 12. As evident from the exploded view of FIG. 3, a stay device which enables a user to open and close the window is provided in or on the frame. In FIG. 4 this stay device is also shown separately for the purpose of elucidation. The stay device comprises a set of stays 51, 52 on either side of the frame, these extending at a first, proximal outer end from a linear guide 61, 62 which is accommodated in the frame. At their opposite, distal outer ends the stays are connected pivotally to the window 20, 21. The stays 51, 52 are adjustable in the guide 61, 62 between a first position, in which the stays lie at least substantially flat relative to the guide, and a second position in which the stays have taken on a raised state from the guide. The window can thereby be forced from a closed closing position to an at least partially opened pivoting position and vice versa. An energizing thereof will be further elucidated below.

Figure 5:
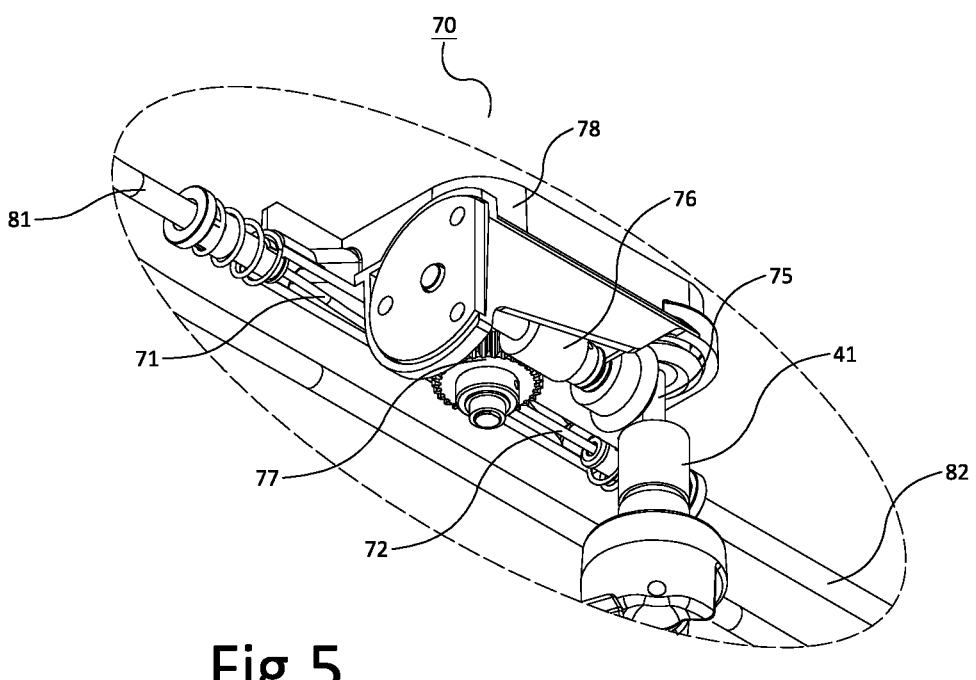
FIG. 5 is an isolated representation of the reel device applied in the panel device of FIG. 4.
Figures 7A, 7B:
FIG. 7A is a bottom view of the panel device of FIG. 1 in an unlocked state.
FIG. 7B is a bottom view of the panel device of FIG. 1 in a locked state.

This embodiment is based on a manual operation of the window by means of a crank 40. The crank 40 is connected around a pivot shaft 43 to a bushing 41 which is provided internally with a toothing which engages on a corresponding external toothing of a drive shaft 75 of a reel device 70. The reel device is shown in more detail in FIG. 5. The drive shaft 75 is coupled operatively to a toothing on a rotation shaft 77 of a reel 78 via a worm wheel 76. Owing to the worm wheel transmission 76, there is no opposite force transmission from reel 78 to crank 40, which prevents window 20 from closing unintentionally. This is helped further by the fact that the crank 40 can be swung around its pivot shaft 43 such that the knob 45 thereof disappears into a cavity provided in the frame for this purpose. This is further illustrated in respectively FIG. 7A and FIG. 7B. In this way the drive shaft 75 can be fixed in a position it has taken up, and the window thus blocked.

Instead of the manual operation described here of the reel 77, 78 by means of a crank or other operating member, a motorized version can otherwise also be provided, wherein the action of the crank is taken over by an output shaft of an electric motor provided in the wall of the frame. In that case the reel 77, 78 is set into rotation by energizing the electric motor in question.

Provided between the reel 78 of reel mechanism 70 and the stays 51, 52 is a flexible transmission. This transmission comprises a set of flexible pull members in the form of steel transmission cables 71, 72, 73 which have each been introduced individually into a sleeve 81, 82, 83 and are axially movable therein. At their outer end the pull cables 71, 72, 73 have a fixation member 74 which hooks into a corresponding recess or opening in the proximal, first outer end of the stay 51, 52 to which the cable is coupled. The two stays 51, 52 slide with the proximal outer end in a linear guide 61, 62. The stays 51, 52 can thus be pulled reciprocally in guide 61, 62 by this outer end by means of the pull cables 71, 72, 73 which are connected to these outer ends on either side. A free opposite outer end of two of the pull cables 71, 72 is received on the reel 78. For this purpose this outer end is also provided with a fixation member 74 and the reel 78 of a corresponding recess or cavity in which the fixation member 74 is received.

The sleeves 81, 82, 83 are laterally bendable but axially rigid, and are thereby not axially compressible, or hardly so. For this purpose the sleeve comprises a metal wire which is wound tightly in a spiral and over which a plastic coating or film is arranged both externally and internally. The two outer ends of the sleeves are fixed in the frame, while the relevant transmission cable 71, 72, 73 remains freely movable therein. As such, an outer end of the sleeves 81, 82, 83 hits the housing of the guide 61, 62 of the stay 51, 52 which is coupled to the pull cable 71, 72, 73 which was introduced into the sleeve.

In order to open or close the window the crank 40 is operated, whereby the reel 77 is set into rotation. The two cables 71, 72 which are received on the reel each lie on their own part of the reel and are guided in a helical track provided in the wall of the reel. The cables are wound in opposite directions, whereby winding up of the one cable simultaneously results in unwinding of the other cable. The reel thereby provides a tension in the one pull cable 71 over a length, while the other pull cable 72 is payed out over the same length. Because the two cables 71, 72 lie enclosed in the sleeves 81, 82 and the sleeves are in turn fixed at their outer end, this respective tension and release is transmitted one-to-one to the coupled outer ends of the stays 51, 52. A synchronization cable 73, 83 provides here for a transmission of the tension on the one stay 51 to the other stay 52 or vice versa. This transmission takes place mutatis mutandis in both rotation directions of the reel 77, 78.

Figure 6:
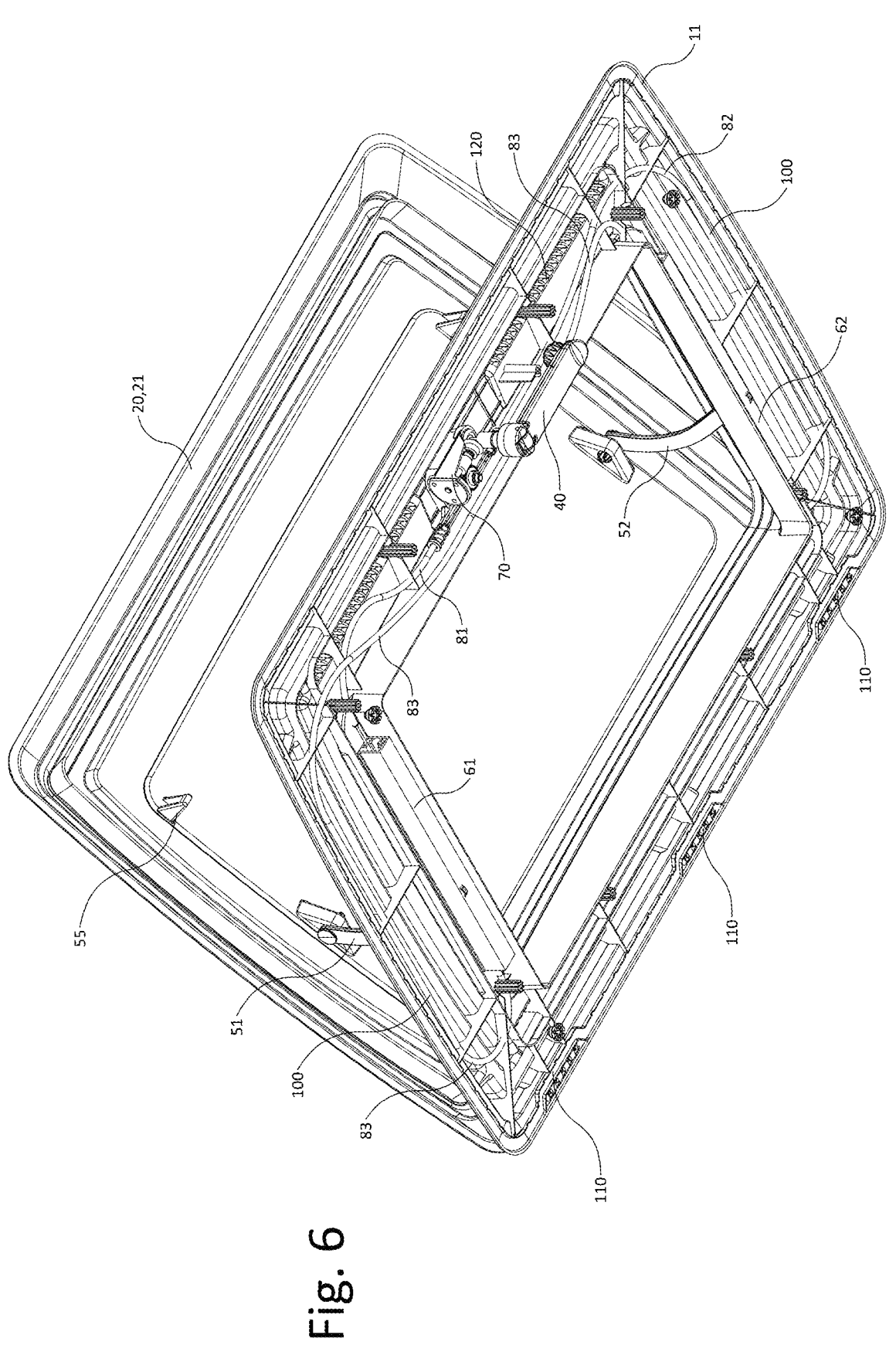
FIG. 6 is a partially cut-away bottom view of the panel device of FIG. 1.

The stay device shown in FIG. 4 can be accommodated entirely in one of the two parts 11, 12 of the frame in particularly practical manner. The external upper part therefore comprises in this embodiment internally a tunnel 100 in which the cable guide 81-83 can be placed and fixed. Extending transversely of the tunnel 100 is a ventilation channel which extends in open communication between a set of external air inlets 110, 120, see FIG. 6, and one or more internal air inlets 130, see FIGS. 2 and 7A, 7B. As in this embodiment, these air openings 110 . . . 130 advantageously lie distributed over a whole length of the relevant side of the frame in accordance with a ventilation gap of the ventilation channel which lies therebetween and which likewise extends laterally over a full width or length of the frame. A uniform natural ventilation of a space located under the frame is hereby realized, particularly in the case of a recreational vehicle when moving.

The movement of the stays in their guides is shown in successive stages in FIGS. 8A-8C, from an at least substantially completely opened position of the window to a locked position of the window. The stay is adjustable from the first position shown in FIG. 8A to a fully flat orientation in which the window will be completely closed. From this flat orientation, the stay 51 can be pulled further into the guide 61. Finally, the proximal outer end of stay 51 hits a locking member 53 at the outer end of guide 61. This third position is shown in FIG. 8C. This locking member 53 thereby pivots about a lock axis 54 around which it is mounted, and falls behind a protrusion 55 provided on the window, see also FIGS. 6, 7A and 7B. A cavity into which the locking element falls in that case can optionally also be provided in the window instead. In both cases the window is thus hermetically sealed in a closed position of FIG. 8C. A torsion spring or coil spring (not shown) is coupled to the locking member 53 and produces a counter-tension which releases the locking member 53 from the protrusion 55, i.e. from the cavity, as soon as the stay 51 is returned to the position shown in FIGS. 8A and 8B and thereby releases the locking member 53.

The invention thus provides a panel device with a particularly compact and effective stay device, which can be incorporated in the frame of the panel device in particularly practical manner and can furthermore be motorized in relatively simple manner.

Although the invention has been further elucidated above with reference to only a single exemplary embodiment, it will be apparent that the invention is by no means limited thereto. On the contrary, many variations and embodiments are still possible within the scope of the invention for a person with ordinary skill in the art. The embodiment is thus based on a window with a fully transparent panel, but the panel device can also be embodied with a merely semi-transparent, translucent panel or with a fully opaque panel. Instead of a rotating actuator, driven by a crank or an electric motor, use can also be made of a translating actuator which imparts an optionally linear stroke to both pull cable outer ends coupled thereto. And instead of a crank it is also possible to provide a different operating member, such as for instance a rotary knob.

The invention claimed is:

1. A roof light for a recreational vehicle, comprising an at least substantially polygonal frame which surrounds an opening and comprising a window, which window is connected to the frame for pivoting about a pivot axis and comprises a panel which extends over the opening, wherein provided between the frame and the window is at least a stay device which is manipulable between a first position, in which the window is forced into a flat state and closes the opening, and at least one second position in which the window is raised by the stay device and leaves the opening at least partially clear, which stay device comprises a stay which extends movably from an elongate guide at a first outer end and is connected pivotally to the window at an opposite, second outer end, wherein the stay is adjustable in the guide between a first position, in which the stay lies at least substantially flat relative to the guide, and a second position in which the stay has taken on a raised state from the guide, wherein the stay is coupled to an actuator via a flexible transmission, wherein the transmission comprises at least one tension-resistant pull member which is coupled to the stay and moves the stay from one of the first and second position to another of the first and second position when the actuator is energized, and wherein the at least one pull member is introduced axially movably into an axially at least substantially rigid yet flexible sleeve, a first outer end of which is fixed to or close to the stay and a second outer end of which is attached to or close to the actuator.

2. The roof light according to claim 1, wherein the guide extends between the first position and the second position on a first side of the frame, transversely of the pivot axis, wherein the actuator is provided on a further side of the frame lying opposite the pivot axis, and wherein the at least one sleeve and pull member extend over at least a part of the first side and at least a part of the further side of the frame.

3. The roof light according to claim 1, wherein a first pull member, engages on the stay in a direction directed toward the first position, and wherein a second pull member, engages on the stay in a direction directed towards the second position.

4. The roof light according to claim 3, wherein the stay device comprises on an opposite side of the frame a second stay, wherein the first pull member, engages on the second stay in a direction directed toward the second position, and wherein the second pull member, engages on the second stay in a direction directed toward the first position.

5. The roof light according to claim 1, wherein the transmission comprises at least a pull member from a group of a substantially non-stretch cable, cord, chain and belt.

6. The roof light according to claim 1, wherein the frame comprises a tunnel in which the transmission is at least partially received.

7. The roof light according to claim 1, wherein the actuator comprises a reel which is mounted for rotation about a rotation shaft, wherein the at least one pull member winds onto the reel on a first side of the reel and unwinds from the reel on an opposite side when the reel rotates, particularly in at least one helical track which extends in an outer wall of the reel, and wherein the reel is provided with a drive whereby the reel can be set into a rotation about the rotation shaft.

8. The roof light according to claim 7, wherein the drive is coupled to the rotation shaft via a worm wheel, wherein the worm wheel engages in a toothing of a toothed wheel which is coupled operatively to the rotation shaft.

9. The roof light according to claim 7, wherein the drive comprises an electrically energizable electric motor.

10. The roof light according to claim 7, wherein the drive comprises a crank with a crank handle shaft which is coupled operatively to the rotation shaft of the reel, which crank can be manually operated in order to perform a rotation about the crank handle shaft.

11. The roof light according to claim 10, wherein the handle is mounted for pivoting about the crank handle shaft and wherein the frame comprises a cavity into which the handle is at least partially pivotable.

12. The roof light according to claim 1, wherein the stay is adjustable in the guide between the first position and a third position, which lies beyond the first position as seen from the second position, wherein a locking device comprising a locking body on the frame and a locking cavity in the window is provided between the frame and the window, which locking body is tiltable about a lock axis and is receivable in the locking cavity, and wherein between the first position and the third position the stay touches the locking body and forces it round the lock axis in order to catch the locking body in the locking cavity.

13. The roof light according to claim 1, wherein the frame comprises at least one ventilation channel which extends between a first ventilation opening on an outer side of the frame and a ventilation opening on an inner side of the frame, and wherein the ventilation channel crosses the transmission.

14. The roof light according to claim 13, wherein the ventilation channel comprises a gap which extends substantially over a whole side of the frame.

* * * * *